(12) United States Patent
Wegener et al.

(10) Patent No.: US 10,753,122 B2
(45) Date of Patent: Aug. 25, 2020

(54) LOCKING SYSTEM AND METHOD FOR LOCKING A CONTAINER

(71) Applicant: IQS Holding GmbH, Langenbach (DE)

(72) Inventors: Norbert Wegener, Kumhausen (DE); Stefan Heier, Pöttmes (DE); Peter Foltyn, Stadtbergen (DE)

(73) Assignee: IQS Holding GmbH (DE)

( * ) Notice: Subject to any disclaimer, the term of this patent is extended or adjusted under 35 U.S.C. 154(b) by 0 days.

(21) Appl. No.: 16/193,225

(22) Filed: Nov. 16, 2018

(65) Prior Publication Data

US 2019/0153751 A1 May 23, 2019

(30) Foreign Application Priority Data

Nov. 20, 2017 (DE) .......................... 10 2017 010 735

(51) Int. Cl.
*E05B 47/00* (2006.01)
*G07C 9/00* (2020.01)
(Continued)

(52) U.S. Cl.
CPC .......... *E05B 47/0001* (2013.01); *E05B 83/02* (2013.01); *G07C 9/00571* (2013.01);
(Continued)

(58) Field of Classification Search
None
See application file for complete search history.

(56) References Cited

U.S. PATENT DOCUMENTS

| 2013/0063248 A1 | 3/2013 | Coutermarsh et al. |
| 2013/0335193 A1 | 12/2013 | Hanson et al. |

(Continued)

FOREIGN PATENT DOCUMENTS

| DE | 102013016097 A1 | 4/2015 |
| WO | 2010019040 A1 | 2/2010 |

(Continued)

OTHER PUBLICATIONS

Office Action issued by German Patent Office for 10 2017 010735.1 dated Mar. 4, 2020 (7 pages).

*Primary Examiner* — Thomas S McCormack
(74) *Attorney, Agent, or Firm* — St. Onge Steward Johnston & Reens, LLC

(57) ABSTRACT

A locking system and a method for locking a container having an actuator for actuating a locking bolt, a container locking controller for controlling the actuator, a container communications device associated with the container locking controller for receiving a locking code, and a container code acquisition device for acquiring a locking code, wherein the container locking controller performs a comparison of received and acquired locking codes and in the event of a correct, matching locking code actuates the actuator, and wherein a central controller generates the locking code and transmits it to the container communications device through a dial-up communications network and a communications code is provided and delivered to the container locking controller by way of the container code acquisition device in such a manner that the container communications device can be activated thereby.

7 Claims, 1 Drawing Sheet

(51) Int. Cl.
*E05B 83/02* (2014.01)
*G06K 19/06* (2006.01)
(52) U.S. Cl.
CPC .... *G07C 9/00912* (2013.01); *E05Y 2900/604* (2013.01); *G06K 19/06037* (2013.01); *G07C 2009/0092* (2013.01)

(56) References Cited

U.S. PATENT DOCUMENTS

| | | | |
|---|---|---|---|
| 2015/0356801 A1* | 12/2015 | Nitu | G07C 9/00912 340/5.61 |
| 2016/0284149 A1* | 9/2016 | Espig | G07C 9/00896 |
| 2016/0364590 A1* | 12/2016 | Wadley | G07C 9/00103 |

FOREIGN PATENT DOCUMENTS

| | | |
|---|---|---|
| WO | 2015079203 A1 | 6/2015 |
| WO | 2017174813 A1 | 10/2017 |

* cited by examiner

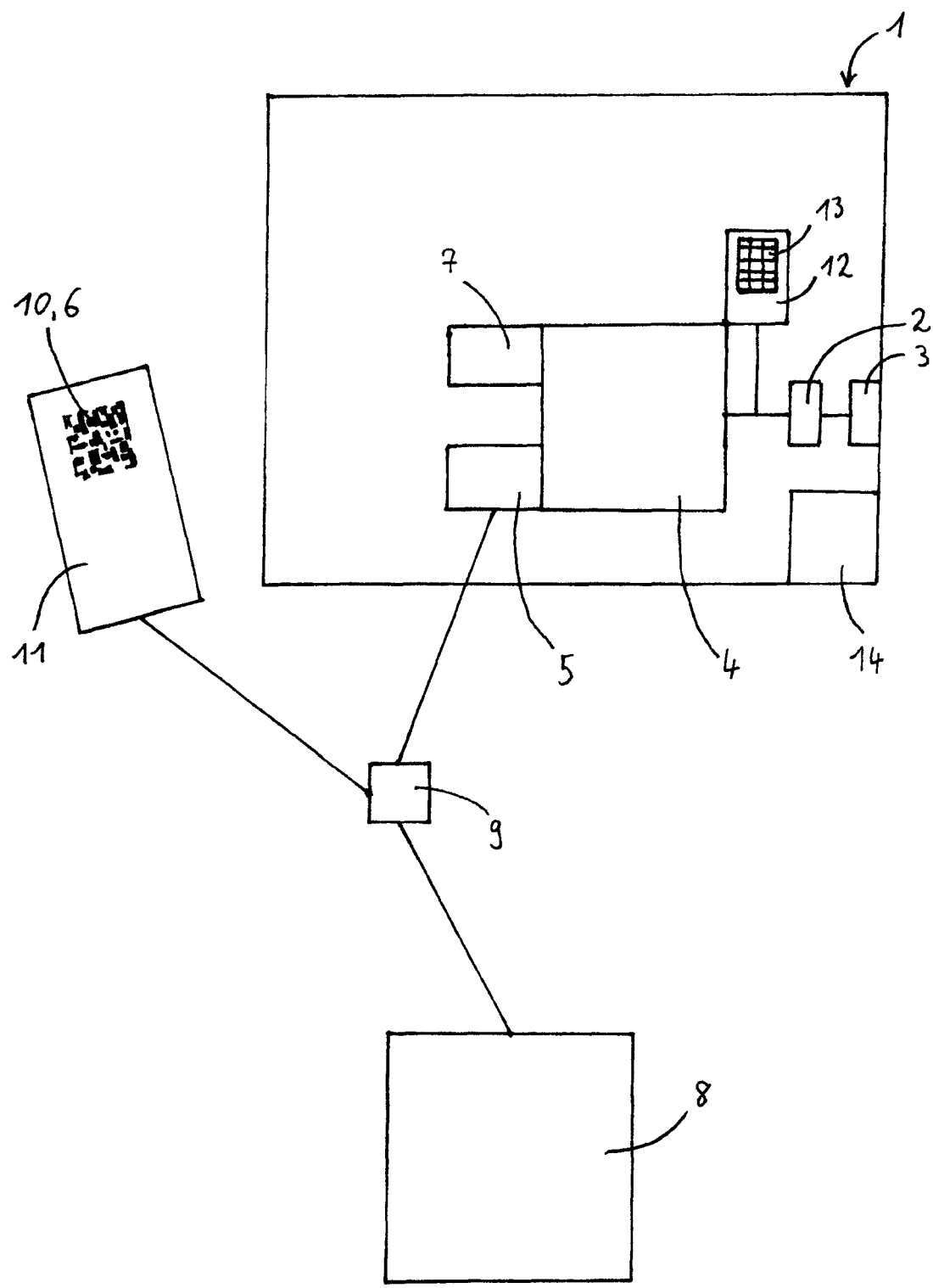

LOCKING SYSTEM AND METHOD FOR LOCKING A CONTAINER

FIELD OF THE INVENTION

The invention relates to a locking system for a container according to the preamble of claim 1.

BACKGROUND OF THE INVENTION

Such a locking system for a container has an actuator for actuating a locking bolt, wherein the actuator preferably can be operated electrically or magnetically, which is to say electromechanically, and thus acts on the locking bolt, wherein the locking bolt interacts with a corresponding mating part, usually an aperture, for engagement and corresponding locking. A container locking controller is provided for controlling the actuator. In the prior art, corresponding locking systems for containers are already in use, for example for truck semi-trailers.

When such locking systems are used in freight containers, in particular in air freight containers that are intended for vehicles, it is a fundamental problem to design corresponding locking systems that are sufficiently secure. Especially when shipping vehicles in such containers, it is necessary to ensure that prototypes or special racing vehicles, in particular, are reliably protected from access by unauthorized parties. The inclusion of keys or open pin codes in the shipping documents sent together with such a container results in a possible security risk in that it is not readily ensured that unauthorized persons cannot gain possession of the codes or keys and open a corresponding container without authorization.

In the area of containers that are permanently attached to truck trailers, an approach already exists to the effect that security codes for opening and closing such containers are sent via telecommunications devices so that opening can only occur with transmitted and correct security codes. However, this cannot be used in the area of air freight containers, in particular, since it is necessary to ensure that all communications devices are deactivated, at least during flight operations.

It is therefore the object of the present invention to provide a locking system for a container, a freight container, in particular an air freight container specifically for shipping vehicles, that overcomes the disadvantages of the prior art and in particular to provide a locking system for a container that is secure, easy to handle, and can be used flexibly including for flight operations. This also applies to a method according to the invention for locking (and opening) a corresponding container.

SUMMARY OF THE INVENTION

This object is attained with the subject matter of independent claim 1. Advantageous improvements to the invention are evident from the dependent claims.

The locking system according to the invention is provided together with a container, having an actuator for actuating a locking bolt, which interacts suitably with a locking aperture to permit locking and opening of the container with the locking system according to the invention, wherein a container locking controller is provided for controlling the actuator. Additionally, according to the invention a container communications device is provided, which is associated with the container locking controller, for receiving a locking code. Furthermore, a container code acquisition device is provided for acquisition of a locking code. The container locking controller here is provided such that it performs a comparison of received and acquired locking codes and in the event of a correct, matching locking code actuates the actuator in order to lock or open the container by means of the locking bolt. Furthermore, according to the invention a central controller is provided that generates the locking code and transmits it to the container communications device through a dial-up communications network. Furthermore, according to the invention a communications code is provided and can be delivered to the container locking controller by means of the container code acquisition device in such a manner that the container communications device can be activated through this communications code. A deactivation can also be carried out through a suitable communications code as appropriate.

According to the invention, it is thus ensured with the locking system for a container that in the case of, e.g., an air freight container, the container communications device is deactivated during flight operations and cannot be activated until needed, so that the corresponding codes are not transmitted until that time in order to provide the greatest possible security through the comparison of acquired and received locking codes at the applicable destination of the container. In this case, for example, the communications code preferably can even be stored in the container locking controller ahead of time, for instance. The reception of the received locking code for storage in the container locking controller can also be carried out ahead of time in a learning step as well.

For the greatest possible security and flexibility of the locking system according to the invention, provision is made according to one embodiment thereof that the locking code and the communications code are transmitted by means of the dial-up communications network and can be retrieved by means of a mobile device. By means of retrieval through the mobile device in interaction with the container code acquisition device, the acquired locking code is delivered to the container locking controller so it can be compared to the received locking code.

Preferably, the container code acquisition device acquires the locking code and/or the communications code through a display of the mobile device in this case. In this design, it is especially preferred that the container code acquisition device can be a camera.

The mobile device can preferably be a cell phone with a suitable app for displaying the locking code and communications code that are to be acquired.

It is especially secure according to the invention when the locking code and/or the communications code are suitable QR codes.

In order to reliably ensure the secure closing and/or opening of a container at the destination, the locking system according to the invention can be provided with an emergency operating device that permits closing and opening of the container in the event of failure of the dial-up communications network, for example by means of a numeric keypad that permits entry of a numeric emergency locking code. For example, a suitable numeric emergency locking code can preferably be stored in the container locking controller ahead of time in a learning step. It is thus ensured that the container with the locking system according to the invention can be reliably opened and locked even at destinations where no dial-up communications network is available.

Preferably the dial-up communications network is a cellular network, which in the meantime is provided largely worldwide with essentially complete coverage.

In the method according to the invention for locking a container, a locking system for the container is provided, having an actuator that actuates a locking bolt, and having a container locking controller for controlling the actuator. According to the invention, a container communications device is provided that is associated with the container locking controller, so that following reception by the container communications device, the actuator is actuated upon acquisition by means of a container code acquisition device and comparison of matching and correct received and acquired locking codes, wherein a central controller generates the locking code (preferably both the received and acquired locking codes) and transmits it to the container communications device through a dial-up communications network. The container communications device is activated by means of a communications code, which is delivered to the container locking controller by means of the container code acquisition device.

With the method according to the invention, as is also the case with the device according to the invention, secure closing and opening of a corresponding container in a manner largely protected from unauthorized access by third parties is thus possible, wherein at the same time it is ensured according to the invention that a container with a locking system of this nature can be employed without problems while using the method according to the invention even in the area of air freight.

The method according to the invention can be carried out accordingly using the device according to the invention.

BRIEF DESCRIPTION OF THE DRAWINGS

The invention shall be described in detail below on the basis of the embodiments that are explained by way of example.

FIG. 1 shows a schematic view of a locking system for a container according to one embodiment of the invention.

DETAILED DESCRIPTION OF THE INVENTION

The container 1 has an actuator 2 for actuating a locking bolt 3, which interacts with a suitable locking aperture of the container 1, to appropriately permit locking and opening of the of the container 1. The container 1 also has a container locking controller 4 for controlling the actuator 2. Integrated into the container is a battery 14 for supplying the locking system according to the invention with power.

A container communications device 5 is provided, which is associated with the container locking controller 4, for receiving a locking code 6, and a container code acquisition device 7, implemented as a camera, is provided for acquisition of a locking code 6. The container locking controller 4 is provided such that it performs a comparison of received and acquired locking codes 6 and in the event of a correct, matching locking code 6 actuates the actuator 2 for opening or locking the container 1. A central controller 8 is provided that generates the locking code 6 and transmits it to the container communications device 5 through a dial-up communications network 9, preferably a cellular network. A communications code 10 is also provided, and is delivered to the container locking controller by means of the container code acquisition device 7, so that the container communications device 5 can be activated thereby, for example at the destination, in a suitable manner according to the invention. The locking code 6 and the communications code 10 are also transmitted by means of the dial-up communications network 9 and can be retrieved by means of a mobile device 11, also shown. Preferably these are QR codes, which can be acquired by the container code acquisition device 7, implemented as a camera, through the display of the mobile device 11.

For emergency opening, an emergency operating device 12 is available that permits closing and opening of the container 1 in the event of failure of the dial-up communications network 9, by means of a numeric keypad 13 that permits entry of a numeric emergency locking code.

In addition to the use of QR codes, which can be acquired by means of a camera as the container code acquisition device 7, it is also possible where appropriate for RFID chips with a suitable reader to activate the container communications device in place of the camera, at least as the communications code. This permits an even more technically simple implementation of the activation of the container communications with the information provided via the central controller 8 by means of the dial-up communication network 9.

Even though at least exemplary embodiments have been shown in the foregoing description, various changes and modifications may be made. The said embodiment is merely exemplary, and is not intended to limit the scope of validity, the applicability, or the configuration of the locking system in any way. Rather, the foregoing description provides the person skilled in the art with a plan for implementation of at least one exemplary embodiment of the locking system, wherein numerous changes may be made in the function and the design of the locking system from components described in the exemplary embodiment without departing from the scope of protection of the attached claims and their legal equivalents.

What is claimed is:

1. A locking system for a container, comprising:
an actuator for actuating a locking bolt, a container locking controller for controlling the actuator, a container communications device associated with the container locking controller for receiving a first locking code, and a container code acquisition device for acquisition of a second locking code;
wherein the container locking controller is provided such that it performs a comparison of received first locking code and acquired second locking code and, in the event the first and second locking codes match, actuates the actuator;
wherein a central controller is provided that generates the first locking code and transmits it to the container communications device through a dial-up communications network; and
wherein a communications code is provided and is delivered to the container locking controller by means of the container code acquisition device in such a manner that the container communications device can be activated thereby.

2. The locking system according to claim 1, wherein the second locking code and the communications code are transmitted by means of the dial-up communications network and can be retrieved by means of a mobile device.

3. The locking system according to claim 2, wherein the container code acquisition device acquires the second locking code and the communications code through a display of the mobile device.

4. The locking system according to claim 1, wherein the container code acquisition device is a camera.

5. The locking system according to claim 1, wherein the locking code and the communications code are QR codes.

6. The locking system according to claim 1, further comprising an emergency operating device that permits closing and opening of the container the event of failure of the dial-up communications network by means of a numeric keypad that permits entry of a numeric emergency locking code.

7. The locking system according to claim 1, wherein the dial-up communications network is a cellular network.

\* \* \* \* \*